(12) United States Patent
Mohamed

(10) Patent No.: US 11,816,130 B2
(45) Date of Patent: Nov. 14, 2023

(54) GENERATING AND CONTROLLING AN ELASTICALLY SCALABLE STAMP DATA STRUCTURE FOR STORING DATA

(71) Applicant: Microsoft Technology Licensing, LLC, Redmond, WA (US)

(72) Inventor: Ahmed Hassan Mohamed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/493,131

(22) Filed: Oct. 4, 2021

(65) Prior Publication Data

US 2023/0105249 A1    Apr. 6, 2023

(51) Int. Cl.
*G06F 16/27* (2019.01)
*G06F 16/22* (2019.01)

(52) U.S. Cl.
CPC .......... *G06F 16/27* (2019.01); *G06F 16/2228* (2019.01)

(58) Field of Classification Search
CPC .... G06F 16/27; G06F 16/2228; G06F 16/273; G06F 16/275; G06F 16/278
See application file for complete search history.

(56) References Cited

U.S. PATENT DOCUMENTS

| | | | | |
|---|---|---|---|---|
| 10,037,346 | B1* | 7/2018 | Hsieh | G06F 16/2343 |
| 2007/0079126 | A1* | 4/2007 | Hsu | G06F 21/606 |
| | | | | 713/181 |
| 2008/0195583 | A1* | 8/2008 | Hsu | G06F 16/2455 |
| 2012/0166390 | A1 | 6/2012 | Merriman et al. | |
| 2012/0254221 | A1* | 10/2012 | Lai | G06F 16/2358 |
| | | | | 707/769 |
| 2012/0278293 | A1 | 11/2012 | Bulkowski et al. | |
| 2013/0159251 | A1 | 6/2013 | Skrenta et al. | |
| 2016/0314156 | A1* | 10/2016 | Konik | G06F 16/219 |
| 2017/0013058 | A1 | 1/2017 | Annamalai et al. | |
| 2017/0286516 | A1 | 10/2017 | Horowitz et al. | |
| 2020/0242104 | A1* | 7/2020 | Persson | G06F 16/2379 |
| 2021/0037072 | A1* | 2/2021 | Chakravorty | H04L 65/61 |
| 2021/0173851 | A1* | 6/2021 | Dome | G06F 16/9532 |

OTHER PUBLICATIONS

"International Search Report and Written Opinion Issued In PCT Application No. PCT/US22/040016", dated Dec. 16, 2022, 12 Pages.

* cited by examiner

*Primary Examiner* — Allen S Lin
(74) *Attorney, Agent, or Firm* — Christopher J. Volkmann; Kelly, Holt & Christenson, PLLC

(57) ABSTRACT

In a computing system, data is ingested into a primary row of shards in a stamp data structure. The stamp data structure includes a primary row of data shards and a set of replica rows of data shards so the data shards are arranged in rows and columns in the stamp structure. The ingested data is replicated from the primary row into the replica rows of data shards. Each of the data shards, in each row, is evaluated to identify a particular data shard in each column of shards to generate a logical row of data shards. Queries against the data shards are serviced from the logical row of data shards. The system dynamically controls expansion and contraction of the number of data shards in a row and of the number of replica rows.

20 Claims, 15 Drawing Sheets

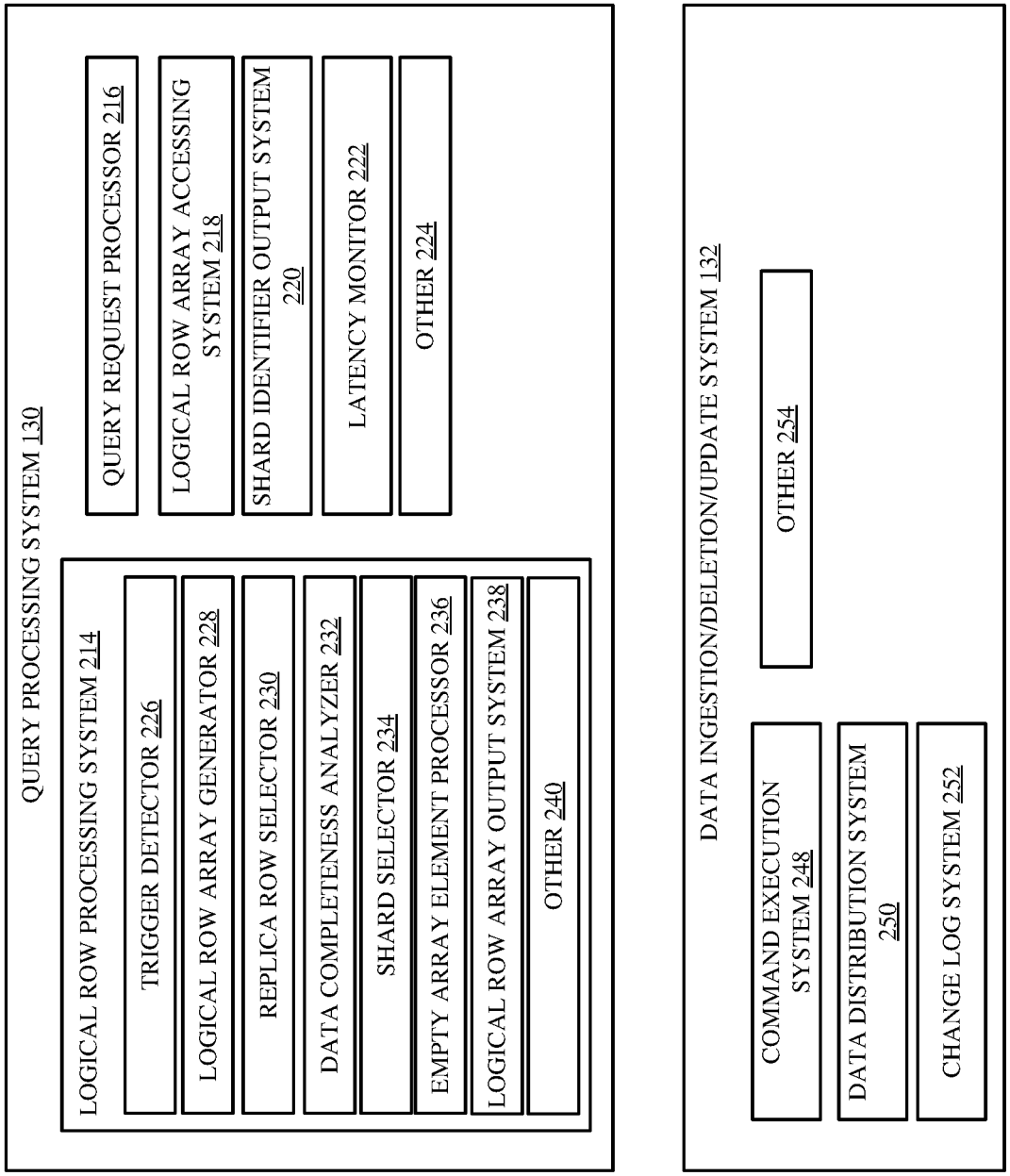

GENERATING AND CONTROLLING AN ELASTICALLY SCALABLE STAMP DATA STRUCTURE FOR STORING DATA

BACKGROUND

Computer systems are currently in wide use. Some computer systems include hosted systems that host applications and services for accessing and manipulating user data. Such systems also store the user data. These types of systems thus support ingesting, storing, searching, and processing very large data sets.

Some current computing systems partition data sets into different partitions. The data sets are stored in a container and there is often one container per tenant, per group, or per user in the computing systems. Also, a service that is deployed on the computing system may define its own storage model and create its own storage space. When the container assigned to the service runs out of space, these current systems often employ relatively high latency approaches in assigning additional data storage capacity to the service.

Also, when the computing system assigns a container for a group of users or for an entire tenant, there may be a large number of concurrent data accesses. This means that throughput or data access latency can suffer.

The discussion above is merely provided for general background information and is not intended to be used as an aid in determining the scope of the claimed subject matter.

SUMMARY

In a computing system, data is ingested into a primary row of shards in a stamp data structure. The stamp data structure includes a primary row of data shards and a set of replica rows of data shards so the data shards are arranged in rows and columns in the stamp structure. The ingested data is replicated from the primary row into the replica rows of data shards. Each of the data shards, in each row, is evaluated to identify a particular data shard in each column of shards to generate a logical row of data shards. Queries against the data shards are serviced from the logical row of data shards. The system dynamically controls expansion and contraction of the number of data shards in a row and of the number of replica rows.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4B is a block diagram showing an example of a query processing system.

FIG. 4C is a block diagram showing an example of a data ingestion/deletion/update system.

DETAILED DESCRIPTION

As discussed above, some current systems assign a data container to a user or set of users. When the container becomes full, the container may be enlarged, or a separate, larger container can be assigned. However, this does not help throughput. For instance, if there are multiple different users, and those users are simultaneously requesting access to the same user record, then the throughput or latency in responding to the query will suffer, and this is not addressed by enlarging the data container.

In order to address this type of deficiency, some systems replicate the data multiple times so that queries for the same data record can be directed against different replicas of the data. However, when doing a replication, the computing system attempts to replicate the data by writing the data into a plurality of different replicas and must wait until all of those replication processes, against all of the different replicas, are successfully completed before returning on the write operation. As the number of replicas grows, the chances of one of the replicas having difficulty in performing the replication process increases. Therefore, the replication process can be time consuming and consume computing resources, even if only a single replica is operating suboptimally during the replication write operation.

The present description thus proceeds with respect to a data accessing system that stores data in a stamp structure. The stamp structure is formed of a plurality of different rows of data shards. Corresponding data shards in each row are aligned in columns. The present system ingests all data into the stamp data structure through a primary row of data shards and replicates the data into one or more replica rows of data shards. The system then dynamically controls the number of data shards in each row and the number of replica rows in the stamp structure. The present system identifies a data shard that is performing adequately (in terms of data completeness) in each column and assigns that data shard to a logical row. Queries for data are executed against the data shards in the logical row.

Using a logical row reduces latency in responding to queries and also allows queries to be serviced quickly from healthy data shards that are assigned in the logical row, even if some other data shards in the stamp structure are unhealthy (in terms of latency or data completeness).

Figure 1:
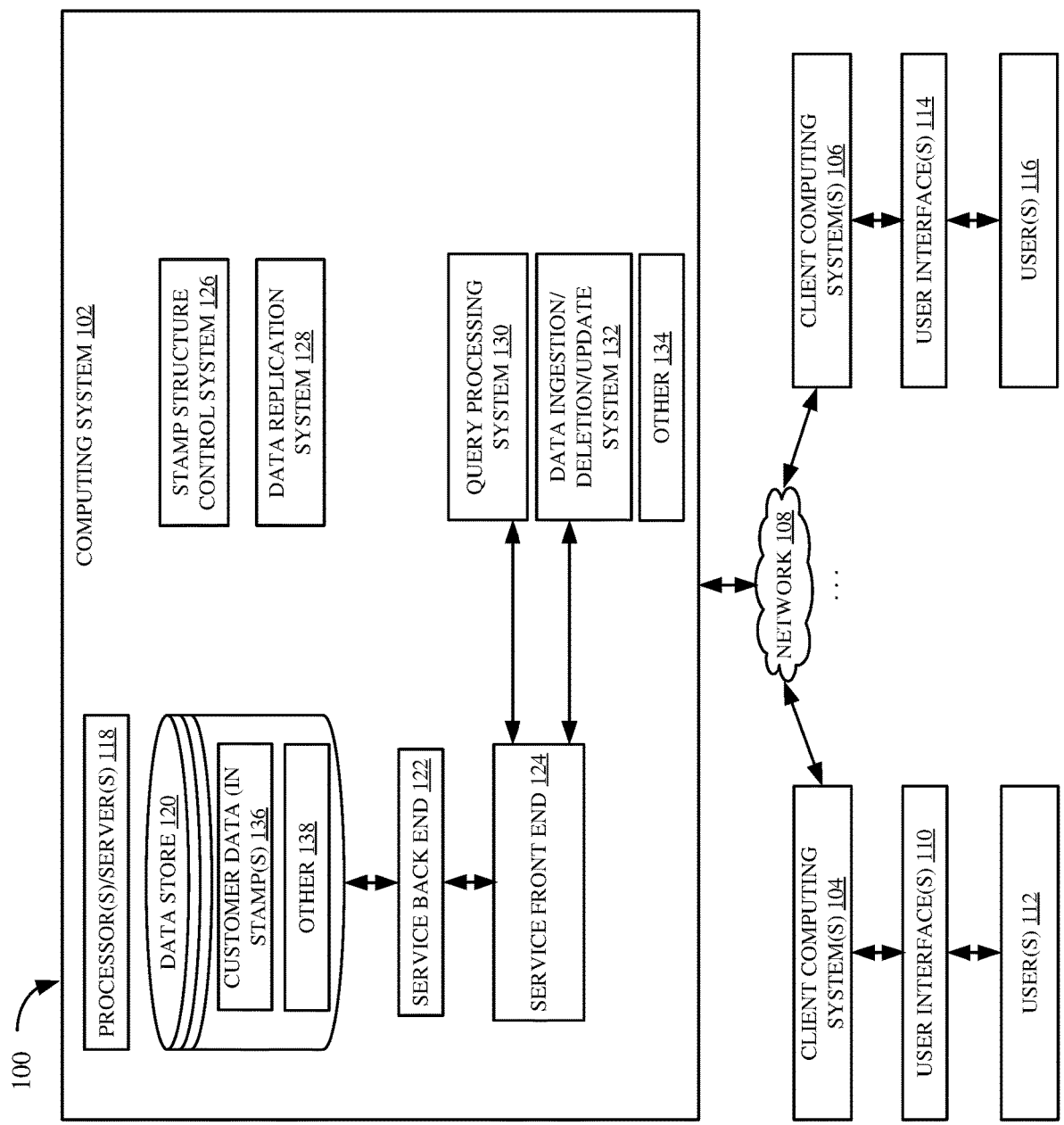
FIG. 1 is a block diagram of one example of a computing system architecture.

FIG. 1 is a block diagram of one example of a computing system architecture 100 in which computing system 102 communicates with one or more client computing systems 104-106 over network 108. Network 108 can thus be a wide area network, a local area network, a near field communication network, a cellular communication network, or any of a wide variety of other networks or combinations of networks. Computing system 102 illustratively hosts one or more services for access by client computing systems 104-106. Client computing system 104 generates a user interface 110 for interaction by user 112. User 112 illustratively interacts with user interface 110 in order to control and interact with client computing system 104 and some items of computing system 102. Similarly, client computing system 106 is shown generating user interfaces 114 for interaction by user 116. User 116 interacts with interfaces 114 in order to control and manipulate client computing system 106 and some items of computing system 102.

In the example shown in FIG. 1, computing system 102 includes one or more processors or servers 118, data store 120, service backend 122, service frontend 124, stamp structure control system 126, data replication system 128, query processing system 130, data ingestion/deletion/update system 132, and other items 134. Data store 120 can hold customer data in data structure 136 for access and manipulation by users. Service front end 124 can expose an interface so that client computing systems 104, 106 can provide requests from users to access and manipulate the service and customer data. The request can be provided to backend 122 which manipulates the customer data based on the request. and may provide an indication that the manipulation has been performed back to service frontend 124 which returns a response to the requesting client computing system 104-106. Stamp structure control system 126 generates and maintains the stamp structures in which customer data 136 is stored. Data ingestion/deletion/update system 132 ingests data from one or more client computing systems 104-106. Data replication system 128 replicates the data within the stamp structures, as is described below. Query processing system 130 receives and processes the queries from the client computing systems 104-106.

Figure 2:
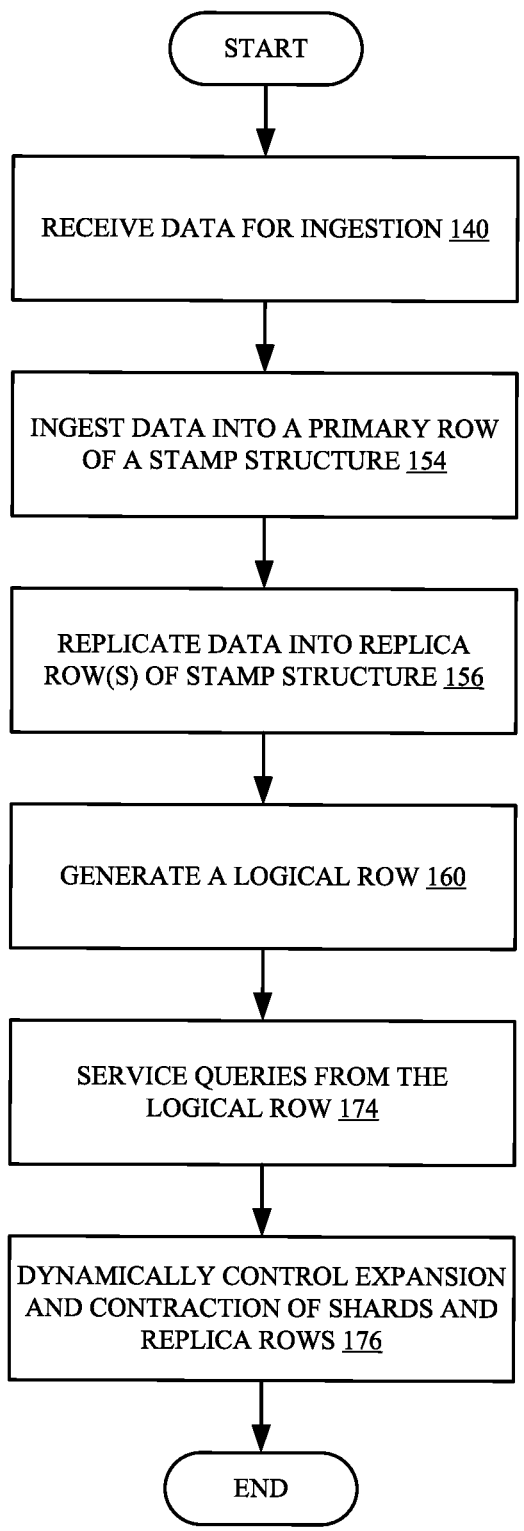
FIG. 2 is a flow diagram illustrating one example of the operation of the computing system shown in FIG. 1.

FIG. 2 is a flow diagram illustrating one example of the operation of computing system 102 in handling data. One of the client computing systems (for purposes of the present discussion, system 104) sends data to service front end 124 for ingestion into stamp data structures in data store 120. Receiving the data for ingestion is indicated by block 140 in the flow diagram of FIG. 2. Stamp structure control system 126 generates a stamp structure that has data shards configured to store the data that is to be ingested into data store 120.

Figure 3:
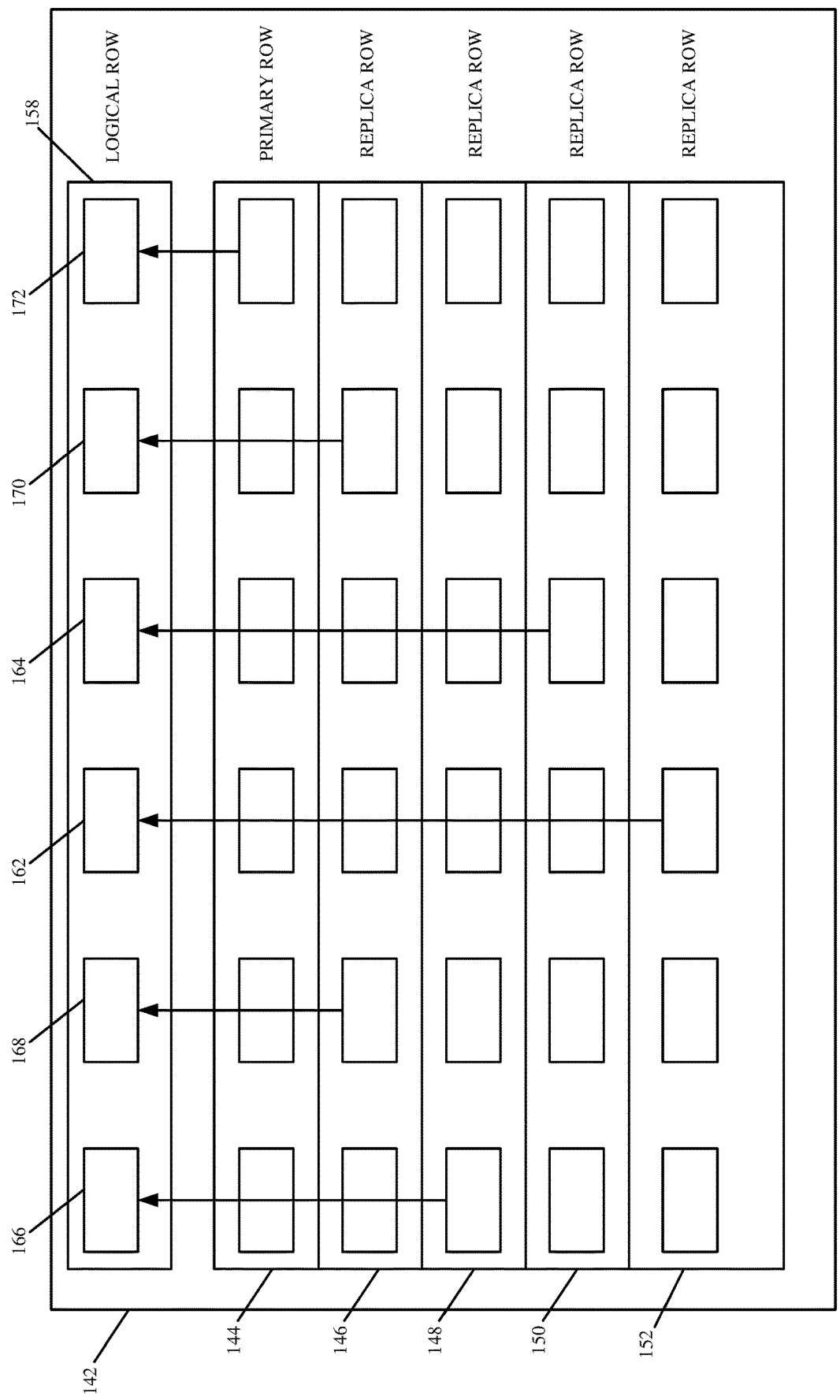
FIG. 3 is a block diagram showing one example of a stamp data structure.

FIG. 3 shows one example of a stamp data structure 142. In the example shown in FIG. 3, stamp data structure 142 has a primary row 144 of data shards (each data shard being represented by a rectangular box), and a plurality of different replica rows 146, 148, 150, and 152 of data shards. There are the same number of data shards in each row 144-152. Primary row 144 is used for the ingestion of all data which includes create, update, and delete operations. The entire data set is represented within the set of data shards in each row 144-152. Therefore, the data in the data shards of primary row 144 represents the entire data set. Once ingested, the data is replicated by data replication system 128 from the data shards in primary row 144 to the data shards in the replica rows 146, 148, 150, and 152. The data shards in each replica row also represent the entire data set. Generating the stamp structure 142 and ingesting the data set into the data shards in primary row 144 is indicated by block 154 in the flow diagram of FIG. 2. Replicating the data into the replica rows is indicated by block 156 in the flow diagram of FIG. 2.

For example, the data from the first data shard in primary row 144 is replicated to the first data shards in the replica rows 146, 148, 150, and 152. The data from the second data shard in the primary 144 is replicated in the corresponding data shards (the second data shards) in each of the replica rows 146, 148, 150 and 152, and so on. Therefore, every shard in each column of data shards (formed by corresponding data shards in the rows 144-152) illustratively contains the same data. It will be noted, of course, that the replication process may involve some latency so that the data in the data shards in the replica rows may lag the data in the data shards in the primary row 144 by some amount of latency.

Stamp structure control system 126 then generates a logical row 158 so that queries can be executed against the data shards in the logical row 150. Generating a logical row is indicated by block 160 in the flow diagram of FIG. 2. By way of example, stamp structure control system 126 can access the shards in replica row 152 and determine whether the data shards in replica row 152 have sufficient data completeness (e.g., the data from the corresponding shard in primary row 144 has been sufficiently replicated to the data shards in replica row 152). If the data shard in the replica row has a threshold level of data completeness, the data shard can be identified by stamp structure control system 126 to be included in the logical row 158. Assume, for the sake of the present description, that the third data shard in replica row 152 has sufficient data completeness. It is thus marked for inclusion as data shard 162 in logical row 158. Processing then proceeds with respect to replica row 150 to determine which data shards in replica row 150 have sufficient data completeness. Assume for the sake of the present example that the fourth data shard in replica row 150 has sufficient data completeness so that it can be marked for inclusion as data shard 164 in logical row 150. The processing then continues with respect to replica row 148. Assume for the sake of the present discussion that the first data shard in replica row 148 has sufficient data completeness so that it is marked for inclusion as data shard 166 in logical row 148. Assume the same processing continues with respect to replica row 146 so that the second shard in replica row 146 can be identified as shard 168 in logical row 158, and the fifth shard in replica row 146 can be identified for inclusion as data shard 170 in logical row 158.

Now assume, for the sake of example, that the sixth data shards in all of the replica rows 146-152 have insufficient data completeness. In that case, the sixth shard from primary row 144 can be selected for inclusion as data shard 172 in the logical row 158.

In one example, logical row 158 is represented by an array of elements, with each element in the array identifying the particular data shard that is to be accessed during a query operation. Then, when a query is received by service frontend 124, it is passed through service backend 122 and executed against the desired data shard in logical row 158. This ensures that the data shard to be accessed has a sufficient data completeness to respond to the query.

Figure 3A:
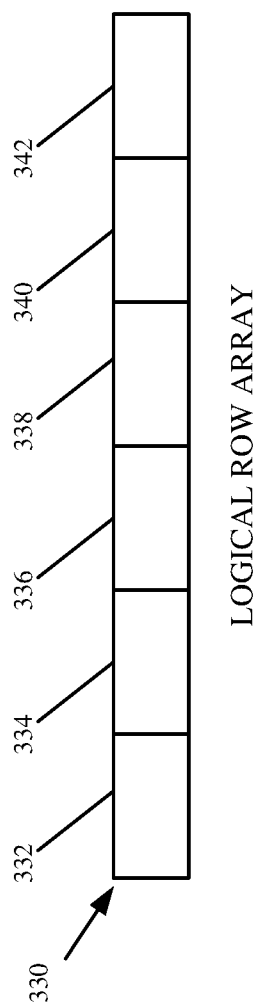
FIG. 3A is a representation of a logical row array.

FIG. 3A shows one example of a logical row array 330. The logical row array 330 has a set of array elements 332, 334, 336, 338, 340, and 342. Upon instantiation, the array elements 332-342 are empty. As the logical row 158 is generated, the shard identifiers for each column are inserted in the array elements 332-342 to identify the data shards in the logical row 158.

In addition, if multiple data shards in one column (from multiple replica rows 146-152) have a sufficient data completeness threshold, then each of those shards can be analyzed to identify which is performing best with respect to latency in responding to queries, or with respect to other performance criteria. That best performing data shard can be selected for inclusion in logical row 158. In another example, the data shard in the column can be selected at random, from those data shards in the same column that have a sufficient data completeness. Servicing queries from the logical row 158 is indicated by block 174 in the flow diagram of FIG. 2.

The number of data shards in the primary row 144 and each of the replica rows 146-152 can be expanded and contracted dynamically. For instance, if all of the data shards in primary row 144 are filled, or cannot be accessed with sufficiently low latency, then data shards can be added to primary row 144 and to the replica rows 146-152. The data can be rebalanced among the various data shards in the primary row 144 and then replicated to the replica rows 146-152. If the data shards are under utilized, the number of data shards in each row can be contracted. Similarly, the number of replica rows can be expanded and contracted dynamically as well. For instance, if more replica rows are needed to reduce read latency or to increase data completeness, the stamp structure control system 126 can increase the number of replica rows. However, if one or more replica rows are being under utilized, then the number of replica rows can be collapsed or contracted to free those memory resources for other systems. Dynamically controlling the expansion and contraction of the number of shards in a row and the number of replica rows is indicated by block 176 in the flow diagram of FIG. 2.

Figure 4A:
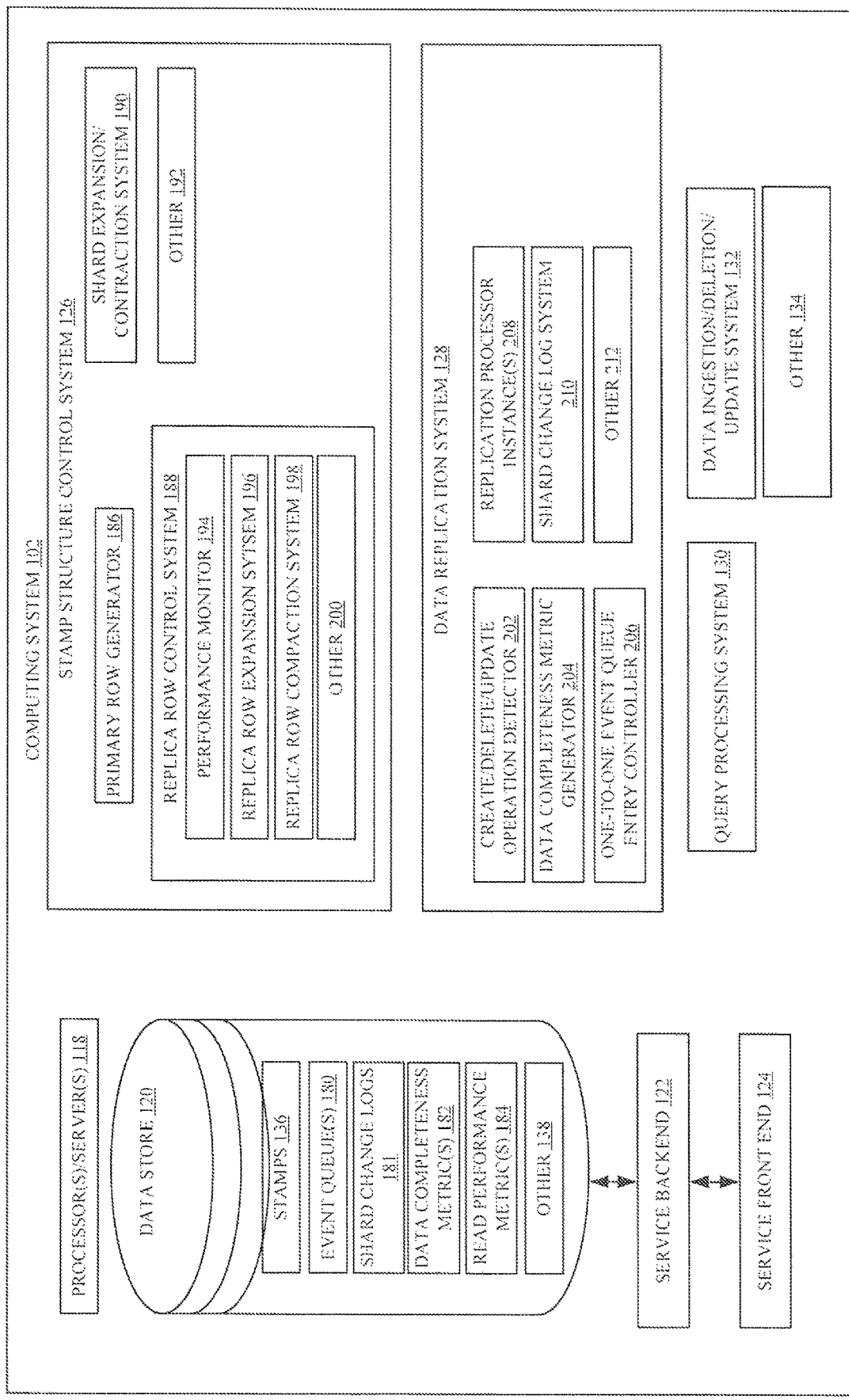
FIG. 4A is a block diagram showing one example of a portion of a computing system in more detail.

FIG. 4A is a block diagram showing one example of a portion computing system 102, with some portions shown in more detail than that illustrated in FIG. 1. FIG. 4B shows a block diagram of query processing system 130 in more detail and FIG. 4C shows a block diagram of data ingestion/deletion/update system 132 in more detail. FIGS. 4A-4C are collectively referred to herein as FIG. 4. FIG. 4 shows that data store 120 can include event queues 180, shard change logs 181, data completeness metrics 182, and read performance metrics 184. FIG. 4 also shows that stamp structure control system 126 can include primary row generator 186, replica row control system 188, shared expansion/contraction system 190, and other items 192. Replica row control system 188 can include performance monitor 194, replica row expansion system 196, replica row compaction system 198, and other items 200.

Data replication system 128 can include create/delete/update operation detector 202, data completeness metric generator 204, one-to-one event queue entry controller 206, replication processor instances 208, shard change log system 210, and other items 212. Query processing system 130 can include logical row processing system 214, query request processor 216, logical row array accessing system 218, shard identifier output system 220, latency monitor 222, and other items 224. Logical row processing system 214 can include trigger detector 226, logical row array generator 228, replica row selector 230, data completeness analyzer 232, shard selector 234, empty array element processor 236, logical row array output system 238, and other items 240.

Data ingestion/deletion/update system 132 illustratively includes command execution system 248, data distribution system 250, change log system 252, and other items 254. Before describing the overall operation of computing system 102 in more detail, a brief description of some of the items shown in computing system 102, and their operation, will first be provided.

When data is to be ingested into data store 120, stamp structure control system 126 generates a stamp data structure 136 to hold the data. Primary row generator 186 generates a primary row 144 of shards. Replica row control system 188 controls the creation and contraction of replica rows 146-152. Performance monitor 194 monitors performance of the service in responding to queries to determine whether additional replica rows are to be provisioned. Replica row expansion system 196 expands the number of replica rows by provisioning a set of data shards for one or more additional replica rows. Replica row compaction system 198 determines when a replica row is being underutilized and compacts the stamp 142, removing that replica row and releasing the corresponding memory for use by other systems. Shard expansion/contraction system 190 determines whether additional shards need to be added to the primary row 144 and replica rows 146-152, or whether shards can be compacted or removed from the rows.

Data distribution system 250 then distributes the data to be ingested among the shards in primary row 144. For instance, data distribution system 250 can use a consistent hashing algorithm, such as by hashing the shard identifier, and data item identifier to distribute the data among the shards in the primary row 144. Command execution system 248 executes (or authorizes execution of) create//delete/update commands on the data. Change log system 252 logs all of the changes that are made to the data in the primary row. For instance, as data is ingested, deleted or updated, all of those changes are logged so that the completeness of the replica rows can be determined. The completeness of the replica rows can be determined by determining what percent of the changes to the primary row (and reflected in the change log) have been made to the replica rows. This is described in greater detail below.

Data replication system 128 replicates the data in the primary row 144 to the replica rows. Create/delete/update operation detector 202 detects changes to the data in primary row 144 so that those changes can be replicated in all of the replica rows 146-152. Create/delete/update operation detector 202 can be a listener instantiated for each shard in the primary row 144 to detecting create/delete/update operations performed in that shard. For each change in the primary row, queue entry controller 206 generates an event in an event queue 180 for each shard in each replica row 146-152, indicating that the detected change to the primary row is to be replicated in each of the replica rows 146-152. Replication processor instances 208 can be instantiated to execute the events on the event queues in order to replicate any changes made to the primary row 144 to the replica rows 146-152.

Change log system 210 then generates a shard change log entry in a shard change log 181 corresponding to each shard in the replica rows indicating which changes have been made to that corresponding shard. Data completeness metric generator 204 compares the last change in the shard change log 181 (e.g., the last change that has been replicated to the corresponding shard) against the one-to-one event query 180 in the primary row (indicating all of the changes made to each shard in the primary row) to determine what percent of the changes made to any given shard in the primary row have been replicated in the corresponding shard in the replica row. The percent of the changes that have been completed (or the raw number of outstanding changes that still need to be made in the replica row or another metric) can be stored by data completeness metric generator 204 as a data completeness metric 182 for each shard in each replica row.

Logical row processing system 214 in query processing system 130 can then generate a logical row 158 within the stamp structure 142 which can be used to service queries against the data in the stamp structure 142. Trigger detector 226 detects a trigger when it is time to generate or update the logical row 158. For instance, the logical row 158 can be updated periodically or otherwise intermittently based on time, when a query is received, when a latency in responding to queries drops below a threshold level, or for a wide variety of other reasons. Logical row array generator 228 then generates a logical row array with the same number of array elements as there are columns in the stamp data structure 142. The array elements in the array are each populated with the identity of a data shard in the stamp structure 142 that should be used for processing a query.

Replica row selector 230 selects one of the replica rows, such as replica row 152. Data completeness analyzer 232 analyzes the data completeness metric for each shard in replica row 152 to determine whether each shard meets a data completeness threshold. Shard selector 234 selects one of the shards in the selected replica row for entry in the logical row 158 based upon the data completeness metric. One all of the replica rows have been processed there may be multiple shards in a column that meet the data completeness metric, in which case shard selector 234 choses one of those shards for entry in the logical row 158. For each shard selected for entry in the logical row 158, logical row array generator 228 places the identifier of the selected shards into the array elements in logical row array 330. It may be that there is an array element in the logical row array that is empty, meaning that none of the shards in the replica rows meet the data completeness threshold. In that case, empty array element processor 236 inserts the identifier of the corresponding data shard from the primary row 144 in that array element. Logical row array output system 288 then generates an output indicative of the identity of the data shards, in the logical row 158 that are to be queried in response to a data query.

Upon receiving a query request, query request processor 216 identifies the particular data to be queried. Logical row array accessing system 218 accesses the logical row array 230 and identifies the particular shard that is to be queried based upon the entry of its identifier in the logical row array 330, and the shard identifier output system 220 generates an output indicative of the identifier of the particular shard or shards that are to be queried in stamp data structure 142 based upon the query request. Latency monitor 222 monitors the latency with which the query is executed so that, if needed, the logical row 158 can be updated based upon the latency in responding to a query.

Figure 5:
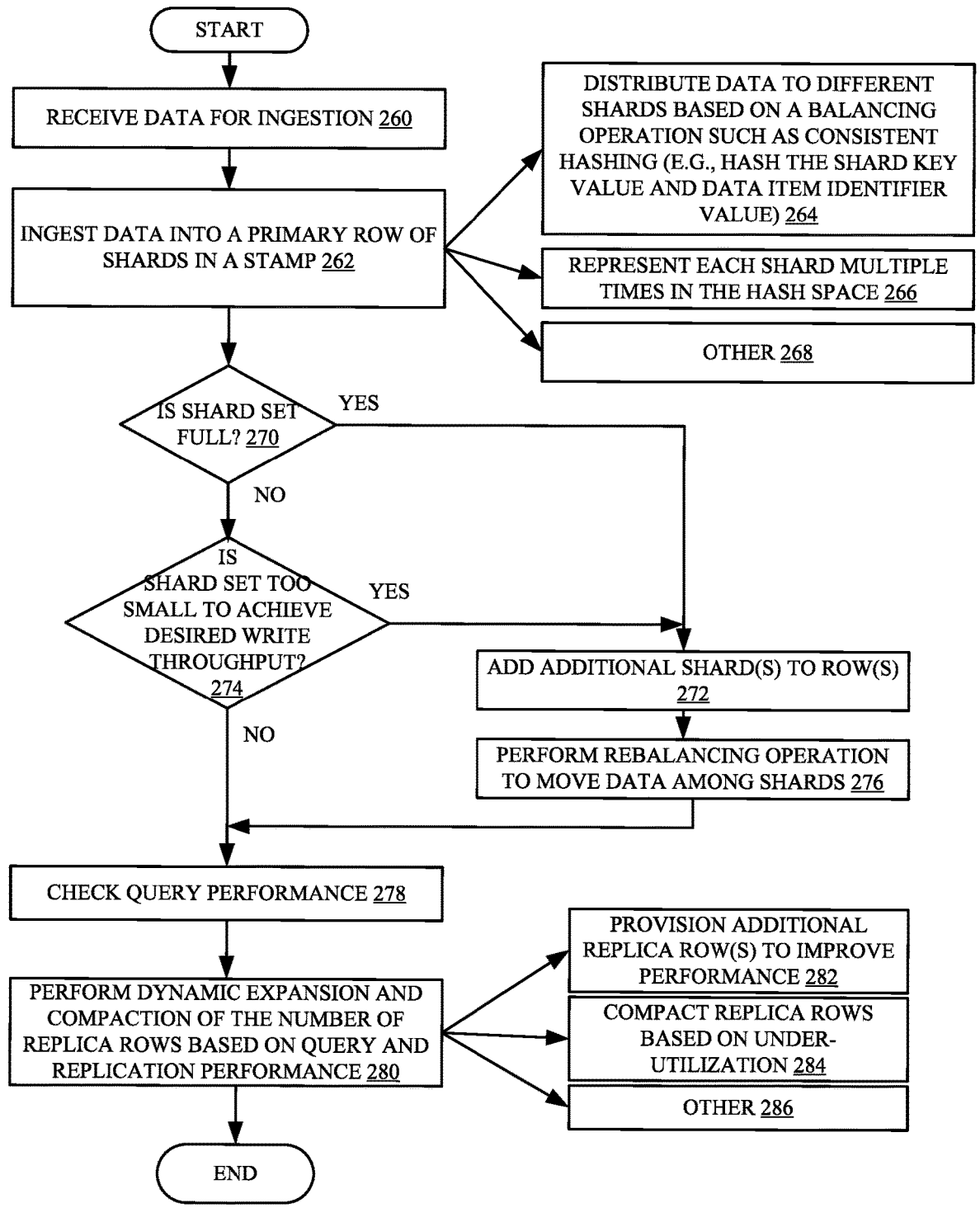
FIG. 5 is a flow diagram illustrating one example of the operation of a computing system during data ingestion.

FIG. 5 is a flow diagram illustrating one example of the operation of computing system 102 in ingesting data. It is first assumed that data ingestion/deletion/update system 132 receives data for ingestion into a stamp structure 142 in data store 120. Receiving data for ingestion is indicated by block 260 in the flow diagram of FIG. 5. Primary row generator 186 generates a primary row 144 in the stamp structure 142 and command execution system 248 indicates to service backend 122 that the data should be ingested into the primary row 144. Service backend 122 write the data to the primary row 144. Ingesting data into the primary row is indicated by block 262 in the flow diagram of FIG. 5. Data distribution system 250 can be used to distribute the data to the different shards of the primary row by performing a balancing operation which balances the distribution of data among the various shards. The balancing operation can be performed using consistent hashing or other hashing operation, such as by hashing the shard key or identifier value and the data item identifier value to obtain a hash value that identifies the shard where the data item is to be stored. Distributing the data in this way is indicated by block 264 in the flow diagram of FIG. 5. Each shard can be represented multiple times in that hash space to increase performance as well. Representing each shard multiple time is indicated by block 266 in the flow diagram of FIG. 5. The data can be ingested into a primary row in other ways as well, as indicated by block 268.

Shard expansion/contraction system 190 can determine whether the shard set in the primary row 144 is full, as indicated by block 270 in the flow diagram of FIG. 5. If so, additional shards can be added to the row or rows in the stamp structure 142, as indicated by block 272. Similarly, shard expansion/contraction system 190 can determine, even if the shard set is not yet full, whether the shard set is too small to achieve desired write throughput (e.g., whether ingestion of data is taking too long because there are not enough shards in which to write the data more quickly), as indicated by block 274. Again, if the shard set is too small, then processing continues at block 272 where additional shards are added to the row or rows in the stamp structure. Data distribution system 250 then performs a rebalancing operation to move the data among the shards, now that new shards have been added. For instance, the data distribution system 250 can distribute the data uniformly across the hash space in the different shards or it can perform rebalancing in other ways. Performing rebalancing operation to move the data among the shards in indicated by block 276 in the flow diagram of FIG. 5.

Row expansion system 196 and replica row compaction system 198 monitor the performance of the system by monitoring the output of performance monitor 194 to determine whether the performance in responding to queries is sufficient. For instance, performance monitor system 194 can generate a latency output indicating the latency with which queries are serviced. If that latency is too high, then row expansion system 196 may determine that additional replica rows need to be added to the stamp structure. If the performance metric indicates that there is under utilization of one or more of the rows, then replica row compaction system 198 can determine that one or more replica rows should be eliminated, releasing the corresponding memory resources to other systems. Checking the query performance by accessing the read performance metrics 184 is indicated by block 278 in the flow diagram of FIG. 5. Performing expansion and compaction of a number of replica rows based upon the query and replication performance is indicated by block 280 in the flow diagram of FIG. 5. Additional replica rows can be provisioned to improve performance as indicated by block 282 and replica rows can be compacted based on under utilization as indicated by block 284. Performing a dynamic expansion and compaction of the replica rows in the stamp structure can be performed in other ways as well, as indicated by block 286.

Figure 6:
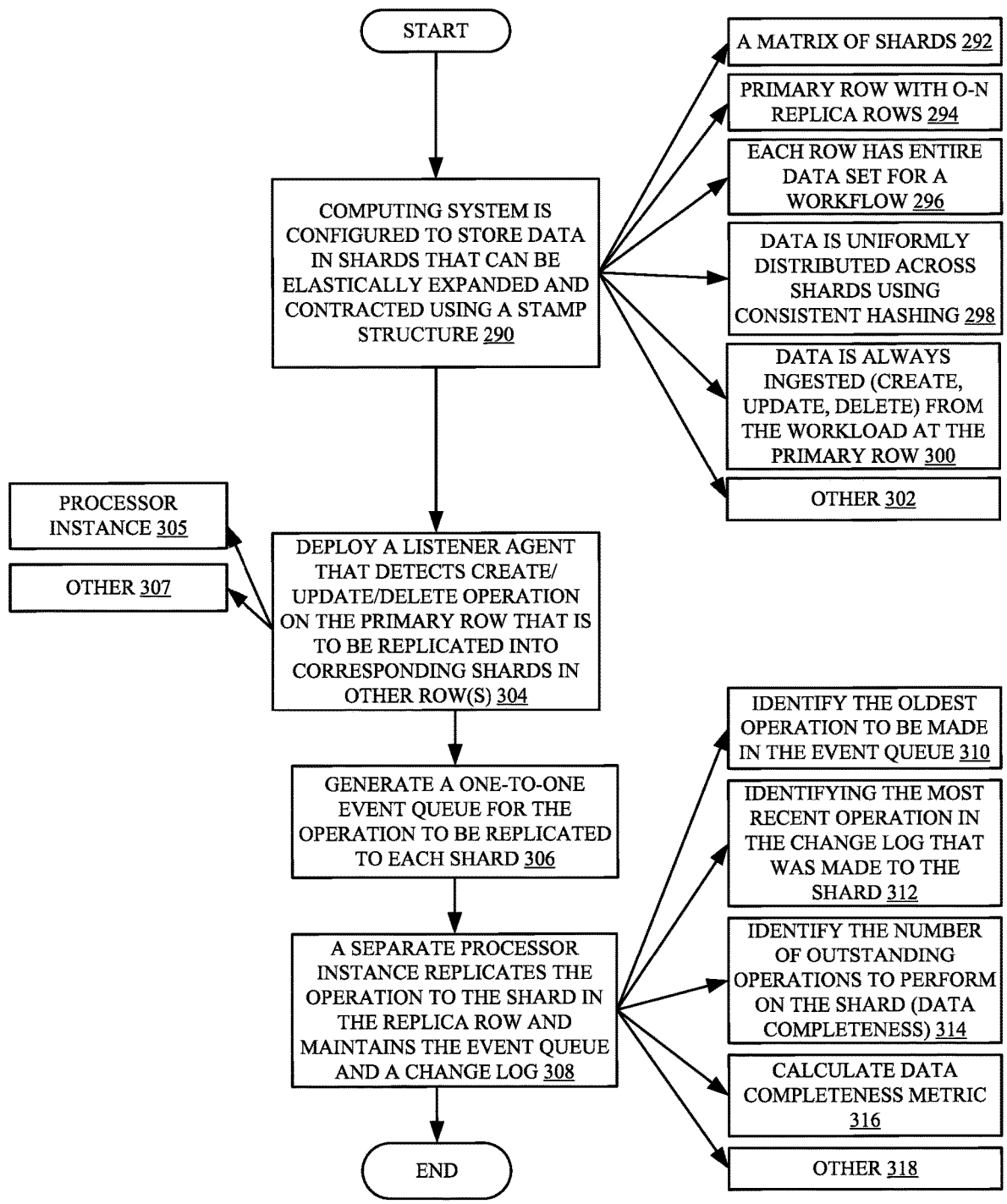
FIG. 6 is a flow diagram illustrating one example of a computing system in performing data replication.

FIG. 6 is a flow diagram illustrating one example of the operation of computing system 202 in performing data replication in stamp structures 136 (for purposes of the present discussion, replication will be described with respect to the stamp structure 142 shown in FIG. 3). It is first assumed that computing system 102 is configured to store data in stamps, such as stamp 142, that includes data shards that can be elastically expanded and contracted, dynamically, within the data stamp data structure 142, as indicated by block 290 in the flow diagram of FIG. 6. In one example, the data shards are arranged as a matrix, such as that shown in FIG. 3, as indicated by block 292. The stamp structure illustratively has a primary row 158 with a number N of replica rows 144-152, as indicated by block 294. Each row of shards has an entire data set for a workflow, as indicated by block 296. The data distribution system 250 can distribute the data uniformly across the shards in each row using consistent hashing, as indicated by block 298. Data is always ingested, in one example, from the workload into the primary row 144, as indicated by block 300. Also, in one example, all create, update, and delete operations are first performed in the primary row 144. The computing system can be configured with a stamp data structure in other ways as well, as indicated by block 302.

Data replication system 128 deploys a listener agent, such as create/delete/update operation detector 202 to detect create/update/delete operations that are performed on primary row 144 and that are to be replicated into corresponding shards in other rows 146-152. Deploying a listener agent to detect create/update/delete operations at each shard in primary row 144 is indicated by block 304 in the flow diagram of FIG. 6. The listener agents (e.g., detectors 202) can be processor instances 306 or other listener agents 308 as well.

For each detected create/update/delete operation performed on a shard in primary row 144, one-to-one event queue entry controller 206 generates an entry corresponding to that operation in an event queue for each corresponding shard in the replica rows 146-152. For instance, if a create operation is performed on the first shard in primary row 144, then an event is entered in a one-to-one event queue for the first shard in each of the replica rows 146-152. Each event is to perform the same create operation in one of the shards in a replica row. Thus, again taking the stamp structure 142 as an example, when a create operation is performed on the second shard in primary row 104, then four events are placed in the event queue. One event is to perform the same create operation in the first shard in replica row 146. Another event is to perform the same create operation in the first shard in replica row 148. Another event is to perform the same create operation in the first shard in replica row 150, and another event is to perform the same create operation in the first shard in replica row 152. Generating a one-to-one event queue for the operation to be replicated in each corresponding shard in the replica rows is indicated by block 306 in the flow diagram of FIG. 6.

Separate processor instances then replicate the operation to the shards in the replica rows 146-152 and maintain an event queue and a change log corresponding to each shard. The change log reflects changes from the one-to-one event queue that have been made to the corresponding shard represented in the change log. Therefore, by seeing the number of events remaining in the one-to-one event queue for a particular shard and the latest operation performed on that shard as indicated in the change log for that shard, one can identify the number of events that still need to be performed on the shard for the shard to have 100 percent data completeness (e.g., in which all changes made to the corresponding shard in the primary row 144 have been made to the shard in the replica row). Having separate processor instances replicate the operation to the corresponding shards in the replica rows 146-152 and maintaining the one-to-one event queue and the change log is indicated by block 308 in the flow diagram of FIG. 6. Identifying the oldest operation from the one-on-one event queue that has yet to made in the shard is indicated by block 310. Identifying the most recent operation in the change log for the shard that has been made to the shard, is indicated by block 312 in the flow diagram of FIG. 6. Identifying the number of outstanding operations to perform on the shard (as an indication of data completeness) is indicated by block 314. Calculating a data completeness metric (such as the percent of operations that have been performed on the shard or a different data completeness metric) is indicated by block 316. Performing the operations on the data shards, maintaining the event queue in the change log, and calculating data completeness can be performed in other ways as well, as indicated by block 318.

Figure 7:
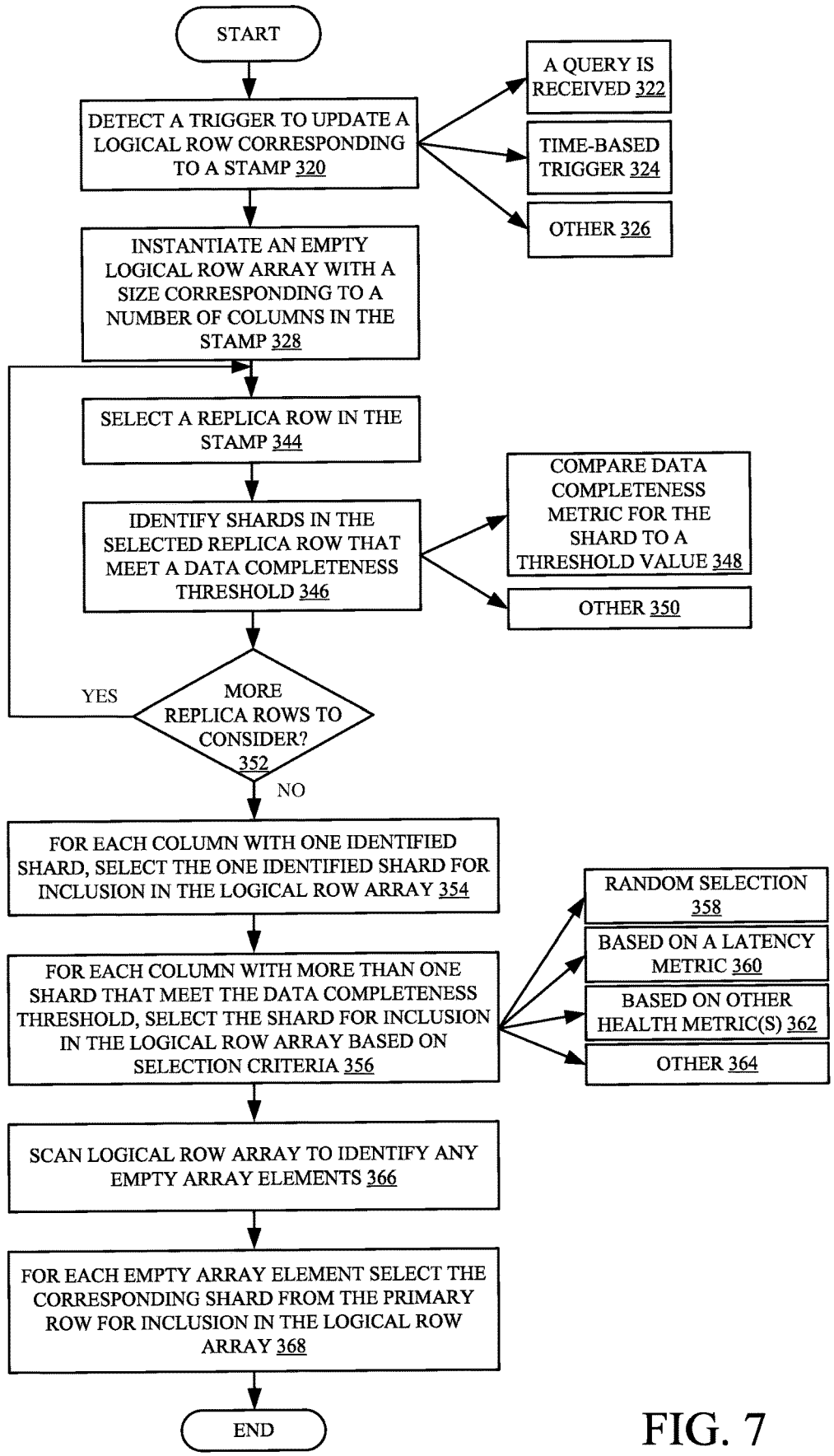
FIG. 7 is a flow diagram illustrating the operation of a computing system in generating a logical row.

FIG. 7 is a flow diagram illustrating one example of the operation of stamp structure control system 126 in generating logical row 158 from the primary row 144 and replica rows 146-158 in stamp structure 142.

Trigger detector 226 first detects a trigger to either generate or update the logical row 148 for the stamp structure 142. Detecting the trigger is indicated by block 320 in the flow diagram of FIG. 7. The trigger may be that a query is received to execute a search against data in stamp structure 142, as indicated by block 322. The trigger may be a time-based trigger in that the logical row 158 is updated periodically or otherwise intermittently based on time, as indicated by block 324. The trigger can be detected in other ways as well, as indicated by block 326.

Logical row array generator 228 then generates an empty logical row array 330 that has the same number of elements 332-342 as there are data shards in primary row 144. Thus, the array 330 has a size corresponding to the number of columns in the stamp structure 142. Instantiating an empty logical row array is indicated by block 328 in the flow diagram of FIG. 7.

Referring also to FIG. 3A, replica row selector 230 then selects a replica row (for purposes of the present description it will be assumed that the first replica row selected is replica row 152). Selecting a replica row in the stamp structure 142 is indicated by block 344 in the flow diagram of FIG. 7.

Data completeness analyzer 232 then identifies shards in the selected replica row 152 that meet a data completeness threshold, as indicated by block 346 in the flow diagram of FIG. 7. A data completeness value generated for each shard can be compared against a data completeness metric threshold, as indicated by block 348. Determining whether the shard meets a data completeness threshold can be performed in other ways as well, as indicated by block 350.

Once the shards in replica row 152 have been analyzed, replica row selector 230 determines whether there are any other replica rows to be analyzed in generating logical row 158. Determining whether there are more rows to consider is indicated by block 352 in FIG. 7. For purposes of the present example, it can be seen that replica rows 146, 148 and 150 all still need to be analyzed so processing reverts to block 344 where the next replica row is selected.

Once all of the replica rows have been considered as determined, at block 252, then for each column in stamp structure 142 with one identified shard, that shard is selected for inclusion in the logical row array 330. For example, in the example shown in FIG. 3, the first shard in replica row 148 is selected for the logical row shard 166. Therefore, the identifier for the first shard in replica row 148 is placed in the array element 332 in logical row array 330. The second shard in replica row 146 has been identified to be placed in logical row 148 so its identifier is placed in array element 334 in logical row array 330. This continues, entering the identifier for each identified shard that meets the data completeness threshold, from the columns formed by the shards in the replica rows, into the array elements of logical row array 330. Entering the identifiers of the shards into the array elements of logical array 330 is indicated by 354 in the flow diagram of FIG. 7.

It may be that, in a column in stamp structure 142, there are shards from multiple replica rows that meet the data completeness threshold. Assume, for example, that the first shard in replica row 150 meets the data completeness threshold as does the first shard in replica row 148. In that case, one of the shards must be selected for inclusion in the logical row 158 as shard 166. Selecting one of the shards is indicated by block 356 in the flow diagram of FIG. 7. That selection can be made in a wide variety of different ways. For instance, shard selector 234 can select either the first shard in replica row 150 or the first shard in replica row 148 randomly. Random selection is indicated by block 358. Shard selector 234 can select from among the two shards based on a latency metric indicating how quickly those shards respond to queries, as indicated by block 360. The shard can be selected based on another health metric, as indicated by block 362 or in other ways, as indicated by block 364.

Once all of the replica rows 146-152 have been analyzed, empty array element processor 236 scans the logical row array 330 to determine whether any of the array elements are empty as indicated by block 366. This would mean that none of the shards in the column corresponding to that array element have met the data completeness metric. In that case, shard selector 234 selects the shard from primary row 144 to be in the logical row 158, as indicated by block 368. Thus, the system preferentially selects shards from the replica rows 146-148 to be included in logical row 158 to service queries so that primary row 144 can be used, primary for create/update/delete operations.

Figure 8:
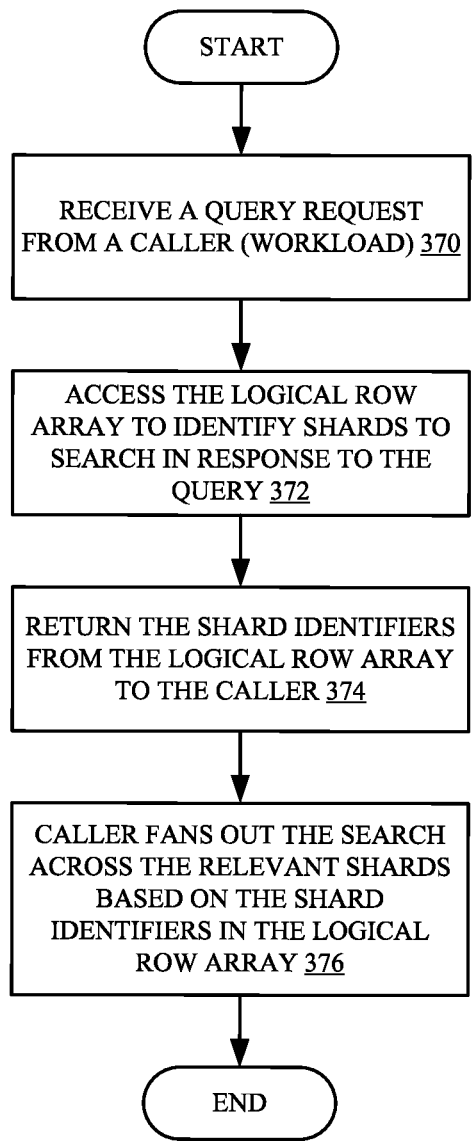
FIG. 8 is a flow diagram illustrating one example of the execution of a search query against a stamp data structure.

FIG. 8 is a flow diagram illustrating one example of the operation of computing system 102 in executing a query or search against data stored in a stamp structure 142. It is first assumed that the computing system 102 receives a query request from a caller (such as a workload) as indicated by block 370 in the flow diagram of FIG. 8. The query can be received through an interface exposed by service frontend 124 or from backend 122 or in other ways. Query processing system 130 receives a notification or other indication that a query has been received and query request processor 216 identifies the portion of the stamp data structure 142 that is to be queried. Logical row array accessing system 218 accesses the logical row array 330 to identify the shards to search in response to the query. For instance, it may be that the query is to be directed against the first shard 166 in the logical row 158 and against the third shard 162. In that case, array elements 332 and 336 will identify the location of those shards in the replica rows 146-152. Thus, the identifier in array element 332 will identify the first shard in replica row 148 and the identifier in array element 336 will identify the third shard in replica row 152. Accessing the logical row array 330 to identify shards to search in response to the query is indicated by block 372 in the flow diagram of FIG. 8.

Shard identifier output system 220 then returns the shard identifiers from the logical row array 330 to the caller, as indicated by block 334. The caller then fans out the search across the relevant shards in stamp structure 142 based upon the shard identifiers in the logical row array, as indicated by block 376.

It can thus be seen that the present description describes a system which addresses latency by dynamically expanding and contracting the number of replica rows in each stamp structure so there are more replicas to respond to queries. Therefore, during an ingestion process, for example, the number of shards in the primary row can be greatly increased to quickly ingest the data. Then, after ingestion, the number of shards can be decreased as desired and data can be rebalanced among the remaining shards.

The present description also proceeds with respect to a system that can dynamically expand and contract the number of shards in each row. A logical row is identified to increase performance by ensuring that at least one shard that meets a data completeness threshold is searchable in the stamp structure so that queries can be quickly and efficiently processed. This decreases latency and increase the likelihood that data completeness is present in the system dynamically controlling the size of the stamp structure increase the efficiency of the system as a whole by not consuming unneeded resources while maintaining adequate resources to serve queries and data ingestion.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
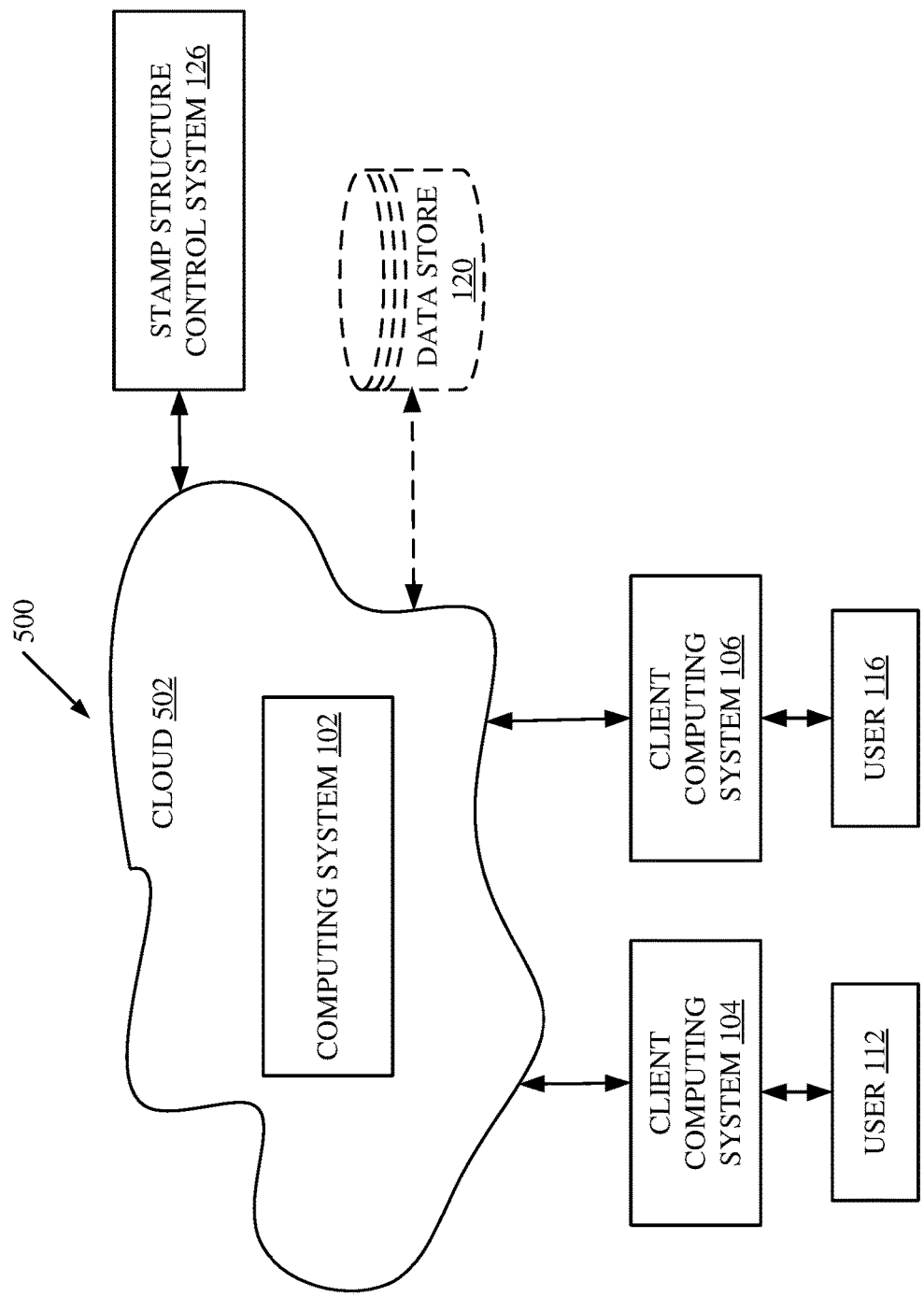
FIG. 9 is a block diagram showing one example of a computing system deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or the resources can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that computing system 102 can be located in cloud 502 (which can be public, private, or a combination where portions are public while others are private). Therefore, user 108 uses a user device 504 to access those systems through cloud 502.

FIG. 6 also depicts another embodiment of a cloud architecture. FIG. 6 shows that it is also contemplated that some elements of computing system 102 can be disposed in cloud 502 while others are not. By way of example, data store 120 can be disposed outside of cloud 502, and accessed through cloud 502. In another example, stamp structure control system 126 (or other items) can be outside of cloud 502. Regardless of where they are located, they can be accessed directly by devices 104 and 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
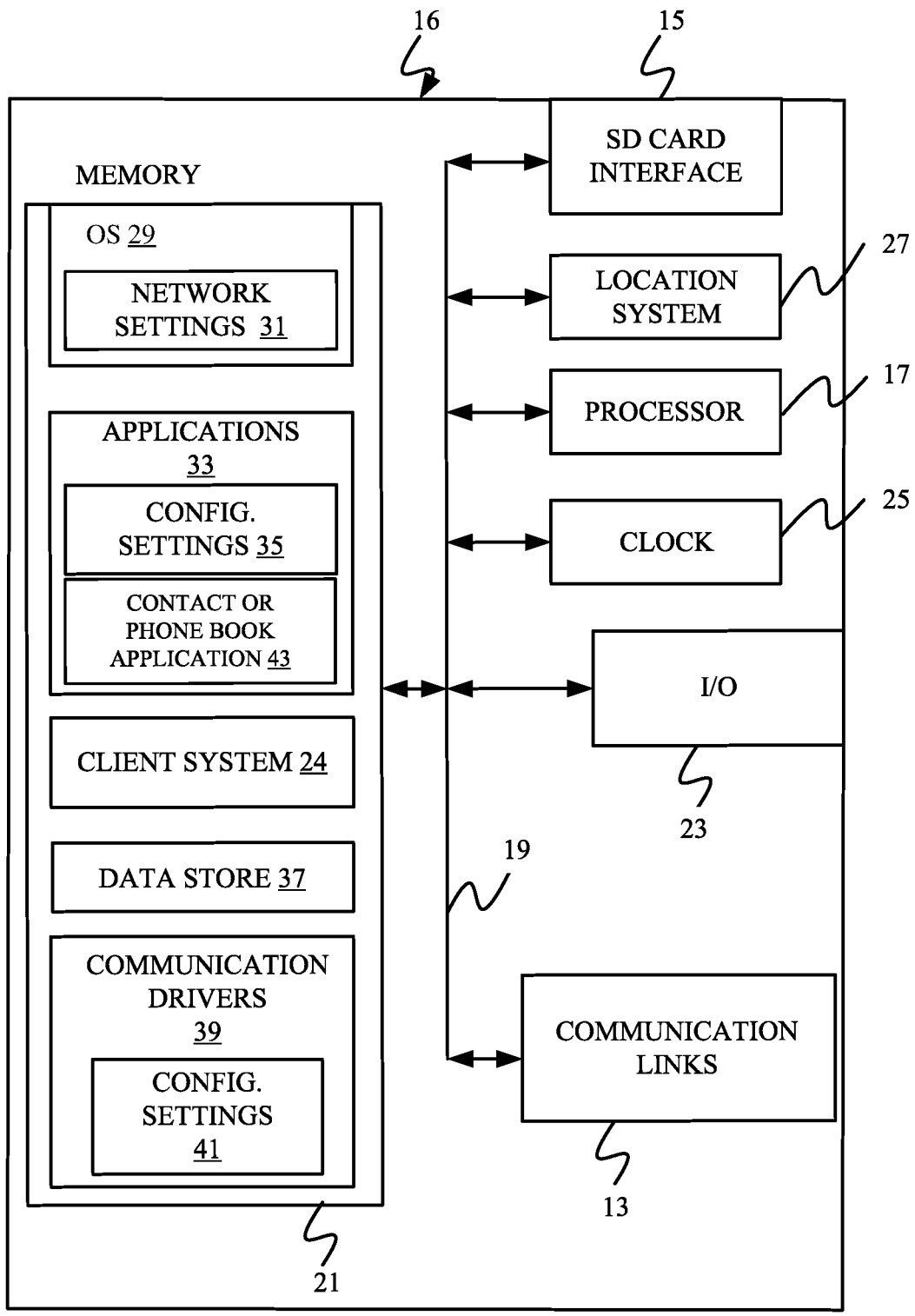
FIGS. 10-12 show examples of mobile devices.
Figure 11:
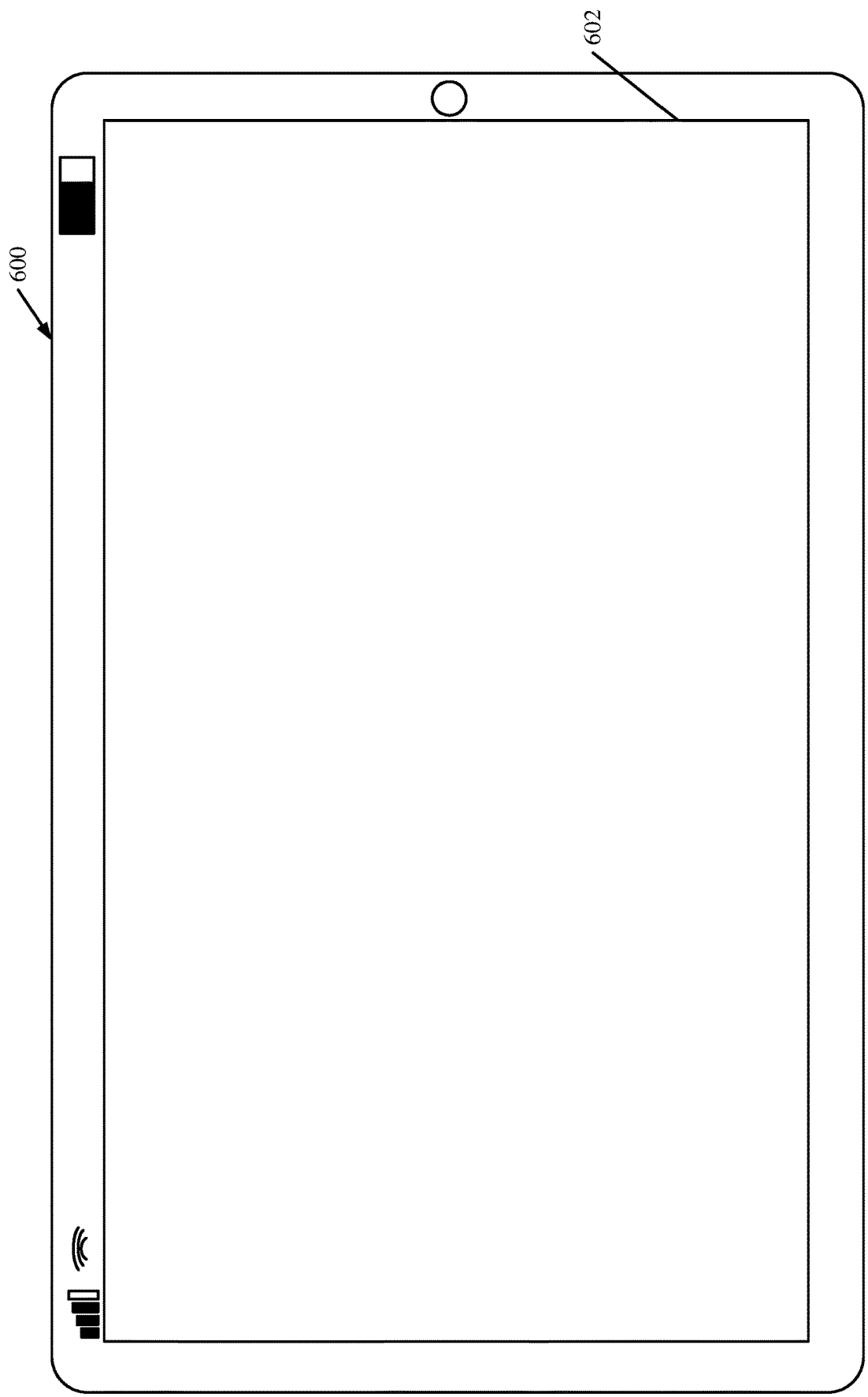
Figure 12:
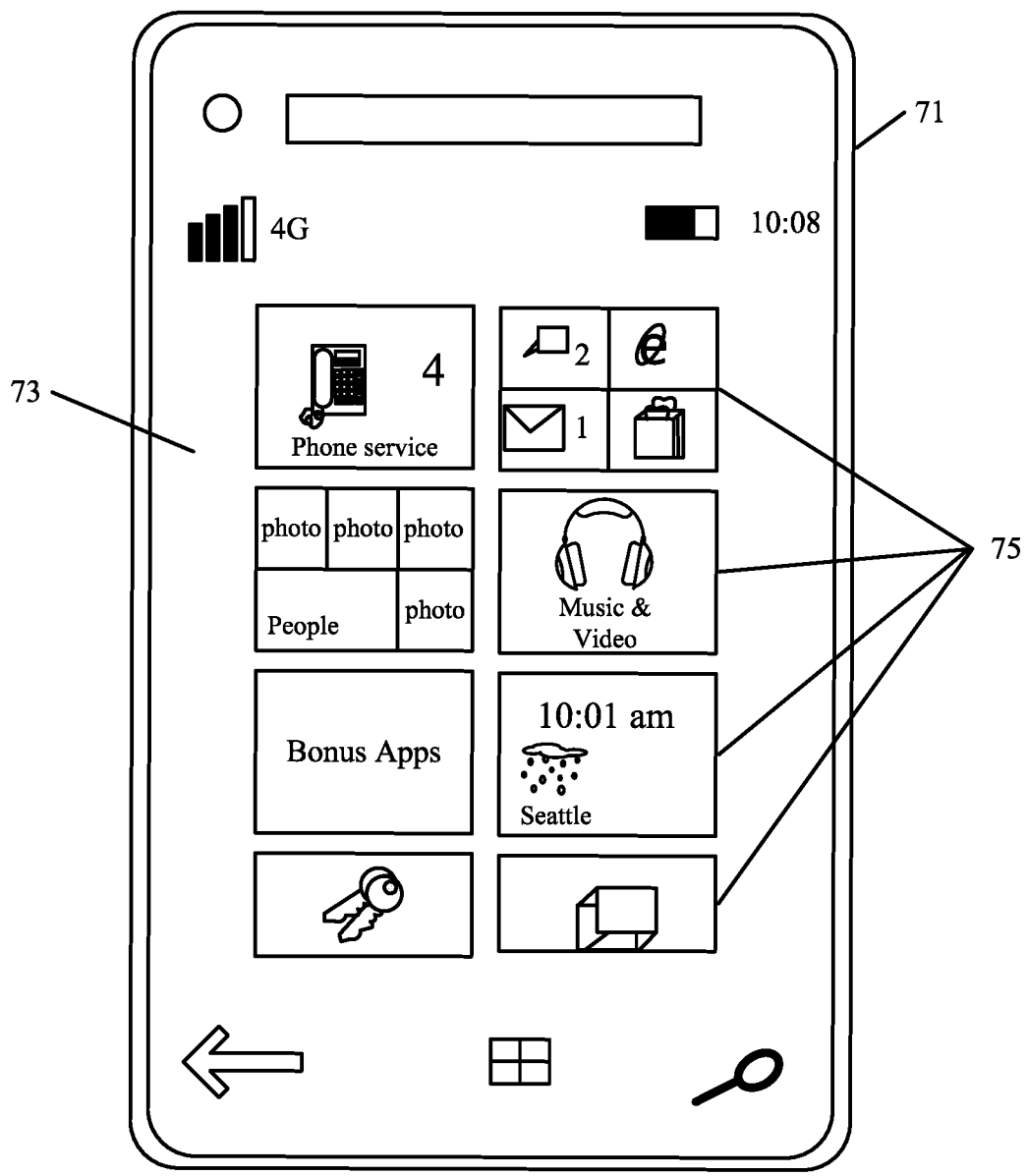

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components computing system 102 or user devices 104-106 or system 116 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
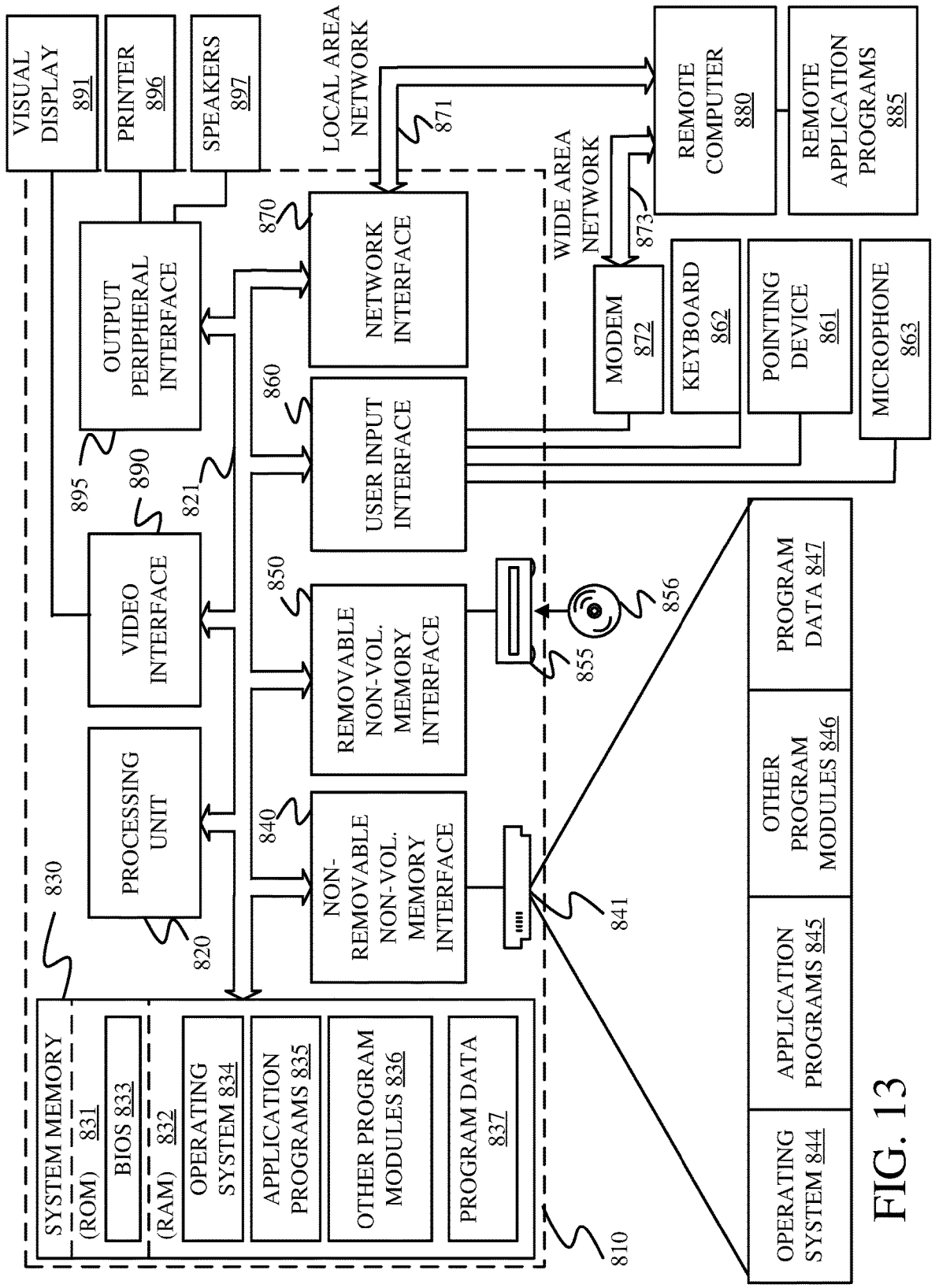
FIG. 13 is a block diagram showing one example of a computing environment that can be used in the architectures and computing systems discussed herein.

FIG. 13 is one example of a computing environment in which architecture 100, or parts of it, (for example) can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
at least one processor; and
a data store storing computer executable instructions which, when executed by the at least one processor causes the at least one processor to perform steps comprising:
writing data to be ingested into a data store to a primary row of data shards in a stamp data structure that includes the primary row of data shards and a replica row of data shards, each data shard in the replica row of data shards corresponding to a separate data shard in the primary row of data shards;
replicating the data into to the replica row of data shards in the stamp data structure;
identifying a logical row of data shards based on a data completeness metric for each data shard in the replica rows of data shards, the data completeness metric being indicative of a completeness of replication of the data from the data shard in the primary row of data shards to the corresponding data shard in the replica row of data shards; and
responding to queries for data by searching the data shards in the logical row of data shards.

Example 2 is the computer system of any or all previous examples wherein identifying a logical row comprises:
detecting the data completeness metric for each data shard in the replica row;
determining whether the data completeness metric meets a data completeness threshold; and
if so, identifying the data shard in the replica row of data shards as a data shard to be included in the logical row of data shards.

Example 3 is the computer system of any or all previous examples wherein the replica row of data shards comprises a first replica row of data shards and wherein the stamp structure includes a second replica row of data shards, each data shard in the second replica row of data shards corresponding to a separate one of the data shards in the primary row of data shards and wherein identifying a logical row of data shards comprises:
if a data shard from the first replica row of data shards and a corresponding data shard from the second replica row of data shards both have a data completeness metric that meets the data completeness threshold, then selecting either the data shard from the first replica row of data shards or the data shard from the second replica row of data shards as the data shard to be included in the logical row of data shards.

Example 4 is the computer system of any or all previous examples wherein the instructions, when executed by the at least one processor cause the at least one processor to perform steps comprising:
if neither the data shard from the first replica row of data shards nor the data shard from the second replica row of data shards meets the data completeness threshold, then using the corresponding data shard from the primary row of data shards in the logical row of data shards.

Example 5 is the computer system of any or all previous examples wherein replicating the data to the replica row of data shards comprises:
detecting a create/update/delete operation performed on a given data shard in the primary row of data shards; and
replicating the detected create/update/delete operation to the data shard in the replica row of data shards corresponding to the given data shard in the primary row of data shards.

Example 6 is the computer system of any or all previous examples wherein replicating the detected create/update/delete operation comprises:
for each replica row, generating a separate entry in an event queue for a data shard corresponding to the given data shard in the primary row of shards, the entry in the event queue being indicative of the detected create/update/delete operation to be replicated to the data shard in the replica row corresponding to the given data shard.

Example 7 is the computer system of any or all previous examples wherein detecting the data completeness metric comprises:
determining a number of outstanding create/update/delete operations that have been performed on the given data shard in the primary row of data shards and that have not yet been performed on the corresponding data shard in the replica row of data shards.

Example 8 is the computer system of any or all previous examples wherein the instructions, when executed by the at least one processor cause the at least one processor to perform steps comprising:
receiving the data to be ingested into the data store; and generating the stamp data structure with a plurality of different replica rows of data shards.

Example 9 is the computer system of any or all previous examples wherein the instructions, when executed by the at least one processor cause the at least one processor to perform steps comprising:

detecting a utilization metric indicative of a level of utilization of the replica rows of data shards; and controlling expansion and contraction of a number of replica rows based on the detected utilization metric.

Example 10 is the computer system of any or all previous examples wherein the instructions, when executed by the at least one processor cause the at least one processor to perform steps comprising:

detecting a performance metric indicative performance of the primary row of data shards; and controlling expansion and contraction of a number of data shards in the primary row of data shards and the number of data shards in the replica rows of data shards based on the performance metrics.

Example 11 is the computer system of any or all previous examples wherein detecting a performance metric comprises:

detecting at least one of an available capacity of the data shards in the primary row of data shards or a write throughput on the shards in the primary row of data shards.

Example 12 is the computer system of any or all previous examples wherein writing data to be ingested into a data store to a primary row of data shards, comprises:

distributing the data among the data shards in the primary row of data shards using a consistent hashing mechanism.

Example 13 is a computer implemented method, comprising:

writing data to be ingested into a data store to a primary row of data shards in a stamp data structure that includes the primary row of data shards and a replica row of data shards, each data shard in the replica row of data shards corresponding to a separate data shard in the primary row of data shards;

replicating the data into to the replica row of data shards in the stamp data structure;

identifying a logical row of data shards based on a data completeness metric for each data shard in the replica row of data shards, the data completeness metric being indicative of a completeness of replication of the data from the data shard in the primary row of data shards to the corresponding data shard in the replica row of data shards; and responding to queries for data by searching the data shards in the logical row of data shards.

Example 14 is the computer implemented method of any or all previous examples wherein identifying a logical row comprises:

detecting the data completeness metric for each data shard in the replica row;

determining whether the data completeness metric meets a data completeness threshold; and if so, identifying the data shard in the replica row of data shards as a data shard to be included in the logical row of data shards.

Example 15 is the computer implemented method of any or all previous examples wherein the replica row of data shards comprises a first replica row of data shards and wherein the stamp structure includes a second replica row of data shards, each data shard in the second replica row of data shards corresponding to a separate one of the data shards in the primary row of data shards and wherein identifying a logical row of data shards comprises:

if a data shard from the first replica row of data shards and a corresponding data shard from the second replica row of data shards both have a data completeness metric that meets the data completeness threshold, then selecting either the data shard from the first replica row of data shards or the data shard from the second replica row of data shards as the data shard to be included in the logical row of data shards.

Example 16 is the computer implemented method of any or all previous examples and further comprising:

if neither the data shard from the first replica row of data shards nor the data shard from the second replica row of data shards meets the data completeness threshold, then using the corresponding data shard from the primary row of data shards in the logical row of data shards.

Example 17 is the computer implemented method of any or all previous examples wherein replicating the data to the replica row of data shards comprises:

detecting a create/update/delete operation performed on a given data shard in the primary row of data shards; and replicating the detected create/update/delete operation to the data shard in the replica row of data shards corresponding to the given data shard in the primary row of data shards.

Example 18 is the computer implemented method of any or all previous examples wherein replicating the detected create/update/delete operation comprises:

for each replica row, generating a separate entry in an event queue for a data shard corresponding to the given data shard in the primary row of shards, the entry in the event queue being indicative of the detected create/update/delete operation to be replicated to the data shard in the replica row corresponding to the given data shard; and replicating the detected create/update/delete operation to the data shard in the replica row corresponding to the given data shard in an order based on the entry in the event queue.

Example 19 is the computer implemented method of any or all previous examples and further comprising:

detecting a utilization metric indicative of a level of utilization of the replica rows of data shards;

controlling expansion and contraction of a number of replica rows based on the detected utilization metric;

detecting a performance metric indicative performance of the primary row of data shards; and controlling expansion and contraction of a number of data shards in the primary row of data shards and the number of data shards in the replica rows of data shards based on the performance metrics.

Example 20 is a computer system, comprising:

a data store storing a stamp data structure comprising a primary row of data shards and a replica row of data shards, each data shard in the replica row of data shards corresponding to a separate data shard in the primary row of data shards;

a data ingestion system configured to write data to be ingested into the data store to the primary row of data shards in the stamp data structure;

a data replication system configured to replicate the data into to the replica row of data shards in the stamp data structure;

a logical row processing system configured to identify a logical row of data shards based on a data completeness metric for each data shard in the replica row of data shards, the data completeness metric being indicative of a completeness of replication of the data from the data shard in the primary row of data shards to the corresponding data shard in the replica row of data shards; and a query processing system configured to service queries for data by searching the data shards in the logical row of data shards.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
    at least one processor; and
    memory storing computer executable instructions which, when executed by the at least one processor causes the at least one processor to perform steps comprising:
        writing data to be ingested into a data store to a primary row of data shards in a stamp data structure that includes a plurality of different rows of data shards, wherein the plurality of different rows comprises:
            the primary row of data shards, and
            a replica row of data shards, each data shard in the replica row of data shards corresponding to a separate data shard in the primary row of data shards;
        replicating the data into the replica row of data shards in the stamp data structure;
        for each respective data shard in the replica row of data shards,
            generating a data completeness metric indicative of a completeness of replication of the data to the respective data shard in the replica row of data shards from the corresponding data shard in the primary row of data shards;
        identifying a logical row of data shards based on the data completeness metrics for the data shards in the replica row of data shards, wherein identifying the logical row of data shards comprises:
            for a given data shard in the replica row of data shards,
                detecting the data completeness metric for the given data shard in the replica row; and
                based on determining that the data completeness metric for the given data shard meets a data completeness threshold, identifying the given data shard in the replica row of data shards as a data shard to be included in the logical row of data shards; and
        responding to queries for data by searching the data shards in the logical row of data shards.

2. The computer system of claim 1 wherein identifying the logical row comprises:
    for each respective data shard in the replica row of data shards,
        detecting the data completeness metric for the respective data shard in the replica row;
        determining whether the data completeness metric for the respective data shard meets the data completeness threshold; and
        if the data completeness metric for the respective data shard meets the data completeness threshold, identifying the respective data shard in the replica row of data shards as a data shard to be included in the logical row of data shards.

3. The computer system of claim 2 wherein the replica row of data shards comprises a first replica row of data shards, the stamp data structure comprises a plurality of replica rows of data shards that includes at least the first replica row and a second replica row of data shards,
    each data shard in the second replica row of data shards corresponds to a separate one of the data shards in the primary row of data shards, and
    identifying the logical row of data shards comprises:
        if a first data shard from the first replica row of data shards and a second data shard from the second replica row of data shards, that corresponds to the first data shard, both have a data completeness metric that meets the data completeness threshold, then selecting either the first data shard from the first replica row of data shards or the second data shard from the second replica row of data shards as the data shard to be included in the logical row of data shards.

4. The computer system of claim 3 wherein the instructions, when executed by the at least one processor cause the at least one processor to perform steps comprising:
    if neither the first data shard from the first replica row of data shards nor the second data shard from the second replica row of data shards meets the data completeness threshold, then using the corresponding data shard from the primary row of data shards in the logical row of data shards.

5. The computer system of claim 3 wherein replicating the data to the replica row of data shards comprises:
    detecting a create/update/delete operation performed on a given data shard in the primary row of data shards; and
    replicating the detected create/update/delete operation to the data shard in the replica row of data shards corresponding to the given data shard in the primary row of data shards.

6. The computer system of claim 5 wherein replicating the detected create/update/delete operation comprises:
    for each respective replica row of the plurality of replica rows,
        generating an entry in an event queue for a data shard corresponding to the given data shard in the primary row of shards, the entry in the event queue being indicative of the detected create/update/delete operation to be replicated to the data shard in the respective replica row corresponding to the given data shard.

7. The computer system of claim 2 wherein detecting the data completeness metric comprises:
    determining a number of outstanding create/update/delete operations that have been performed on the given data shard in the primary row of data shards and that have not yet been performed on the corresponding data shard in the replica row of data shards.

8. The computer system of claim 1 wherein the instructions, when executed by the at least one processor cause the at least one processor to perform steps comprising:
    receiving the data to be ingested into the data store; and
    generating the stamp data structure with a plurality of different replica rows of data shards.

9. The computer system of claim 8 wherein the instructions, when executed by the at least one processor cause the at least one processor to perform steps comprising:
    detecting a utilization metric indicative of a level of utilization of the plurality of different replica rows of data shards; and
    controlling expansion and contraction of a number of replica rows in the plurality of different replica rows based on the detected utilization metric.

10. The computer system of claim 8 wherein the instructions, when executed by the at least one processor cause the at least one processor to perform steps comprising:
  detecting a performance metric indicative performance of the primary row of data shards; and
  controlling expansion and contraction of a number of data shards in the primary row of data shards and the number of data shards in the plurality of different replica rows of data shards based on the performance metric.

11. The computer system of claim 10 wherein detecting a performance metric comprises:
  detecting at least one of an available capacity of the data shards in the primary row of data shards or a write throughput on the data shards in the primary row of data shards.

12. The computer system of claim 1 wherein writing data to be ingested into a data store to a primary row of data shards, comprises:
  distributing the data among the data shards in the primary row of data shards using a consistent hashing mechanism.

13. A computer implemented method, comprising:
  writing data to be ingested into a data store to a primary row of data shards in a stamp data structure that includes a plurality of different rows of data shards, wherein the plurality of different rows comprises:
    the primary row of data shards, and
    a replica row of data shards, each data shard in the replica row of data shards corresponding to a separate data shard in the primary row of data shards;
  replicating the data into the replica row of data shards in the stamp data structure;
  for each respective data shard in the replica row of data shards,
    generating a data completeness metric indicative of a completeness of replication of the data to the respective data shard in the replica row of data shards from the corresponding data shard in the primary row of data shards to
      the corresponding data shard in the replica row of data shards;
  identifying a logical row of data shards based on the data completeness metrics for the data shards in the replica row of data shards, wherein identifying the logical row of data shards comprises:
    for a given data shard in the replica row of data shards, detecting the data completeness metric for the given data shard in the replica row; and
      based on determining that the data completeness metric for the given data shard meets a data completeness threshold, identifying the given data shard in the replica row of data shards as a data shard to be included in the logical row of data shards; and
  responding to queries for data by searching the data shards in the logical row of data shards.

14. The computer implemented method of claim 13 wherein identifying the logical row comprises:
  for each respective data shard in the replica row of data shards,
    detecting the data completeness metric for the respective data shard in the replica row;
    determining whether the data completeness metric for the respective data shard meets the data completeness threshold; and
    if the data completeness metric for the respective data shard meets the data completeness threshold, identifying the respective data shard in the replica row of data shards as a data shard to be included in the logical row of data shards.

15. The computer implemented method of claim 14 wherein
  the replica row of data shards comprises a first replica row of data shards,
  the stamp data structure comprises a plurality of replica rows of data shards that includes at least the first replica row and a second replica row of data shards,
  each data shard in the second replica row of data shards corresponds to a separate one of the data shards in the primary row of data shards, and
  identifying the logical row of data shards comprises:
    if a first data shard from the first replica row of data shards and a second data shard from the second replica row of data shards, that corresponds to the first data shard, both have a data completeness metric that meets the data completeness threshold, then selecting either the first data shard from the first replica row of data shards or the second data shard from the second replica row of data shards as the data shard to be included in the logical row of data shards.

16. The computer implemented method of claim 15 and further comprising:
  if neither the first data shard from the first replica row of data shards nor the second data shard from the second replica row of data shards meets the data completeness threshold, then using the corresponding data shard from the primary row of data shards in the logical row of data shards.

17. The computer implemented method of claim 15 wherein replicating the data to the replica row of data shards comprises:
  detecting a create/update/delete operation performed on a given data shard in the primary row of data shards; and
  replicating the detected create/update/delete operation to the data shard in the replica row of data shards corresponding to the given data shard in the primary row of data shards.

18. The computer implemented method of claim 17 wherein replicating the detected create/update/delete operation comprises:
  for each respective replica row of the plurality of replica rows,
    generating an entry in an event queue for a data shard corresponding to the given data shard in the primary row of shards, the entry in the event queue being indicative of the detected create/update/delete operation to be replicated to the data shard in the respective replica row corresponding to the given data shard; and
  replicating the detected create/update/delete operation to the data shard in the replica row corresponding to the given data shard in an order based on the entries in the event queue.

19. The computer implemented method of claim 18 and further comprising:
  detecting a utilization metric indicative of a level of utilization of the plurality of replica rows of data shards;
  controlling expansion and contraction of a number of replica rows in the plurality of replica rows based on the detected utilization metric;

detecting a performance metric indicative performance of the primary row of data shards; and controlling expansion and contraction of a number of data shards in the primary row of data shards and the number of data shards in the plurality of replica rows of data shards based on the performance metric.

20. A computer system, comprising:

a data store storing a stamp data structure comprising a plurality of different rows of data shards, wherein the plurality of different rows comprises a primary row of data shards and a replica row of data shards, each data shard in the replica row of data shards corresponding to a separate data shard in the primary row of data shards;

at least one processor; and memory storing computer executable instructions which, when executed by the at least one processor, provide:

a data ingestion system configured to write data to be ingested into the data store to the primary row of data shards in the stamp data structure;

a data replication system configured to replicate the data into the replica row of data shards in the stamp data structure;

a data completeness metric generator configured to:
    generate a data completeness metric indicative of a completeness of replication of the data to the respective data shard in the replica row of data shards from the corresponding data shard in the primary row of data shards;

a logical row processing system configured to:
    for each respective data shard in the replica row of data shards,
        detect the data completeness metric for the respective data shard in the replica row;
        based on a determination that the data completeness metric for the respective data shard meets a data completeness threshold, selectively identify the respective data shard in the replica row of data shards as a data shard to be included in a logical row of data shards; and a query processing system configured to service queries for data by searching the data shards in the logical row of data shards.

\* \* \* \* \*